United States Patent
Kooper et al.

(10) Patent No.: US 9,140,811 B2
(45) Date of Patent: *Sep. 22, 2015

(54) WIRELESS DATA ACQUISITION SYSTEM AND METHOD USING SELF-INITIALIZING WIRELESS MODULES

(71) Applicant: Wireless Seismic, Inc., Sugar Land, TX (US)

(72) Inventors: Steven Kooper, Richmond, TX (US); Keith Elder, Richmond, TX (US)

(73) Assignee: Wireless Seismic, Inc., Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/140,048

(22) Filed: Dec. 24, 2013

(65) Prior Publication Data

US 2014/0362666 A1 Dec. 11, 2014

Related U.S. Application Data

(63) Continuation of application No. 12/651,125, filed on Dec. 31, 2009, now Pat. No. 8,614,928.

(51) Int. Cl.
*G01V 1/22* (2006.01)
*G01V 1/00* (2006.01)
*G01V 1/16* (2006.01)

(52) U.S. Cl.
CPC .............. *G01V 1/223* (2013.01); *G01V 1/003* (2013.01); *G01V 1/168* (2013.01)

(58) Field of Classification Search
CPC .............................. G01V 1/168; G01V 1/223

USPC ........................................................ 367/76, 77
See application file for complete search history.

(56) References Cited

U.S. PATENT DOCUMENTS

| 5,818,353 | A | 10/1998 | Eaton et al. |
| 6,400,647 | B1 * | 6/2002 | Huntress ....................... 367/136 |
| 6,775,204 | B2 | 8/2004 | Scott |
| 7,158,049 | B2 | 1/2007 | Hoefel et al. |
| 7,660,203 | B2 | 2/2010 | Barakat et al. |
| 2003/0057769 | A1 | 3/2003 | Scott |
| 2004/0141355 | A1 | 7/2004 | Robertsson et al. |
| 2004/0189487 | A1 | 9/2004 | Hoefel et al. |
| 2005/0073302 | A1 | 4/2005 | Hibbs et al. |

(Continued)

FOREIGN PATENT DOCUMENTS

WO    WO 9530913 A1 * 11/1995 .............. G01V 3/06

*Primary Examiner* — Ari M Diacou
(74) *Attorney, Agent, or Firm* — Marsh Fischmann & Breyfogle LLP

(57) ABSTRACT

Presented are systems and methods for deploying wireless data acquisition modules that facilitate autonomous initialization. The wireless data acquisition modules may initiate a initialization process in response to a stimulus associated with being deployed. The wireless data acquisition module may further conduct a neighbor discovery process and in turn establish a data transfer path among one or more other wireless data acquisition modules. Further, information obtained during a series of autonomous tests may be communicated during the neighbor discovery process and the establishment of the data transfer path may at least in part be based on the information obtained in the autonomous tests.

25 Claims, 8 Drawing Sheets

(56) References Cited

U.S. PATENT DOCUMENTS

| | | |
|---|---|---|
| 2005/0257616 A1 | 11/2005 | Kozlov et al. |
| 2006/0215588 A1 | 9/2006 | Yoon |
| 2006/0251081 A1 | 11/2006 | Choksi |
| 2008/0136421 A1 | 6/2008 | Bryant et al. |
| 2008/0219094 A1 | 9/2008 | Barakat |
| 2010/0195438 A1* | 8/2010 | Goujon .......................... 367/43 |
| 2011/0305114 A1* | 12/2011 | Golparian et al. .............. 367/77 |
| 2015/0160356 A1* | 6/2015 | Friedly et al. .................. 175/19 |

* cited by examiner

WIRELESS DATA ACQUISITION SYSTEM AND METHOD USING SELF-INITIALIZING WIRELESS MODULES

CROSS-REFERENCE TO RELATED APPLICATION

This application is a continuation of U.S. patent application Ser. No. 12/651,125, entitled: "WIRELESS DATA ACQUISITION SYSTEM AND METHOD USING SELF-INITIALIZING WIRELESS MODULES" filed on Dec. 31, 2009, which is incorporated by reference herein as if set forth in full.

FIELD OF THE INVENTION

The present invention relates to wireless data acquisition systems, and specifically, but not exclusively, to wireless data acquisition systems that may employ autonomous initialization, self tests, and autonomous neighbor discovery to establish a wireless array.

BACKGROUND OF THE INVENTION

Seismic surveys are often used by natural resource exploration companies and other entities to create images of subsurface geologic structure. These images are used to determine the optimum places to drill for oil and gas and to plan and monitor enhanced resource recovery programs among other applications. Seismic surveys may also be used in a variety of contexts outside of oil exploration such as, for example, locating subterranean water and planning road construction.

A seismic survey is normally conducted by placing an array of vibration sensors (accelerometers or velocity sensors called "geophones") on the ground, typically in a line or in a grid of rectangular or other geometry. Vibrations are created either by explosives or a mechanical device such as a vibrating energy source or a weight drop. Multiple energy sources may be used for some surveys. The vibrations from the energy source propagate through the earth, taking various paths, refracting and reflecting from discontinuities in the subsurface, and are detected by the array of vibration sensors. Signals from the sensors are amplified and digitized, either by separate electronics or internally in the case of "digital" sensors. The survey might also be performed passively by recording natural vibrations in the earth.

The digital data from a multiplicity of sensors is eventually recorded on storage media, for example magnetic tape, or magnetic or optical disks, or other memory device, along with related information pertaining to the survey and the energy source. The energy source and/or the active sensors are relocated and the process continued until a multiplicity of seismic records is obtained to comprise a seismic survey. Data from the survey are processed on computers to create the desired information about subsurface geologic structure.

In general, as more sensors are used, placed closer together, and/or cover a wider area, the quality of the resulting image will improve. It has become common to use thousands of sensors in a seismic survey stretching over an area measured in square kilometers. Hundreds of kilometers of cables may be laid on the ground and used to connect these sensors. Large numbers of workers, motor vehicles, and helicopters are typically used to deploy and retrieve these cables. Exploration companies would generally prefer to conduct surveys with more sensors located closer together. However, additional sensors require even more cables and further raise the cost of the survey. Economic tradeoffs between the cost of the survey and the number of sensors generally demand compromises in the quality of the survey.

In addition to the logistic costs, cables create reliability problems. Besides normal wear-and-tear from handling, they are often damaged by animals, vehicles, lightning strikes, and other problems. Considerable field time is expended troubleshooting cable problems. The extra logistics effort also adds to the environmental impact of the survey, which, among other things, adds to the cost of a survey or eliminates surveys in some environmentally sensitive areas.

In response to the challenges presented with wired seismic arrays, approaches have been proposed using wireless technologies. For instance, some wireless systems employ a method where digitized data is stored temporarily in a local memory at or near the sensor location. Because the data is not visible to the survey crew, this is often called the "blind read out" method. In these blind read out systems, the seismic data acquired is manually read out from each module once all the seismic data has been gathered. However, such blind read out systems are undesirable, for some survey applications, as any modifications or other problems may not be detected until completion of a survey process. Systems that employ a substantially real-time wireless read out have been proposed. One such system is described in U.S. patent application Ser. No. 11/538,744 filed on Oct. 4, 2006 and assigned to Wireless Seismic, Inc., which is hereby incorporated by reference in its entirety. In this system, a wireless read out of an array is accomplished by way of a serial transfer of data between a series of wireless modules. In this regard, a large quantity of data may be read out over the serial transfer path between the modules.

Such wireless systems often employ complex communication protocols. In this regard, initialization of the wireless modules may require oversight or direction of the setup procedure to facilitate communication. In this regard, an operator may be required to manually interact with the module or a command station to establish communication in the array. This presents added complexity to the system that may result in increased cost of setup, increased time to initialize the array, and introduces the potential for errors to be made by users.

SUMMARY

In response to these and other challenges, approaches for a wireless seismic data acquisition system have been proposed, such as the system described in U.S. patent application Ser. No. 11/538,744 filed Oct. 4, 2006 assigned to Wireless Seismic, Inc. and which is hereby incorporated by reference in its entirety.

It may be advantageous to deploy wireless data acquisition modules into a survey area with low cost, high efficiency, and a reduced potential for error. It may further be advantageous simplify the setup procedure of the wireless modules to decrease the potential for errors and increase the robustness of the system. In this regard, personnel deploying the modules need not have a highly developed skill set to troubleshoot and initiate the wireless data acquisition modules. In turn, fewer individuals with less training may be utilized in order to reduce the cost of the survey. In addition, even if skilled technicians deploy the modules, it may be advantageous to streamline and expedite setup and initialization of the modules regardless of the skill level of those who deploy the modules. Moreover, due to the often rugged or abusive terrain in which the wireless data acquisition modules are deployed, it may be advantageous to provide few mechanical switches or interfaces, which may become prone to damage or failure in the environment encountered by many seismic systems.

The present invention facilitates these advantages by providing a wireless system that self initializes in response to being deployed. The initialization of the modules or nodes may be autonomously carried out in response to a stimulus associated with deployment. By way of example, the orientation of the module may be monitored to determine if the orientation of the module has changed in a way that indicates the module has been deployed. Module initialization may occur in response to the module having been deployed without the need for input or further interaction by a user.

The present invention also may include a wireless system wherein a node or module autonomously performs one or more self tests during initialization. The present invention further facilitates a wireless system wherein a wireless node or module autonomously discovers other modules. A communication channel or channels may be established among the modules following the autonomous discovery process. The modules may exchange and use data acquired during the self test to assist in establishing one or more serial data paths among the modules. As part of the discovery process, error messages or other data regarding the status of each module obtained during the self discovery process may be exchanged between modules when establishing the communication network. In this regard, the communication network may be established taking into consideration modules within the array that are malfunctioning or inoperative in some regard.

A first aspect of the present invention includes a method of enabling a seismic data acquisition module for use in a wireless array. The method includes initializing the seismic data acquisition module in response to an orientation of the seismic data acquisition module. Further, the method includes discovering at least one other seismic data acquisition module in the wireless array and establishing a data transfer path between the seismic data acquisition module and the at least one other seismic data acquisition module.

A second aspect of the present invention includes a method for deploying a plurality of seismic data acquisition modules that comprise a seismic data acquisition system. The method comprises positioning each of the modules in an array and initiating, autonomously, the modules in response to an orientation of the modules. Furthermore, the method includes discovering at each of the seismic data acquisition modules adjacent modules and establishing a data transfer path between the modules. The method also comprises conducting seismic data acquisition and transferring the seismic data gathered in the survey via the data transfer path.

Yet another aspect of the present invention includes a seismic data acquisition module comprising a transceiver; an activation sensor capable of sensing an orientation of the seismic data acquisition module and producing an output; and a microprocessor in operative communication with the activation sensor and operative to interpret the output to determine if the seismic data acquisition module is in an orientation associated with deployment. Upon determining that the seismic data acquisition module is in a deployed orientation, the microprocessor is operative to control the transceiver to broadcast a discovery signal.

Variations and modifications can be made to the aspects of the present invention without departing from the scope of the present invention. These variations and modifications can be made in any combination in any aspect. For example, in one embodiment a wireless module may be operative to perform one or more autonomous tests. These tests may include checks and/or measurements of module components to check for functionality, calibration, or other parameters. Additionally, results of the tests or measurement may be communicated in the discovery process such that modules in an array may, autonomously, recognize potential problems with a malfunctioning module and establish the data communication path to accommodate for the malfunctioning module. This may involve removing the malfunctioning module from the communication path or having the module serve a limited role.

DETAILED DESCRIPTION

Figure 1:
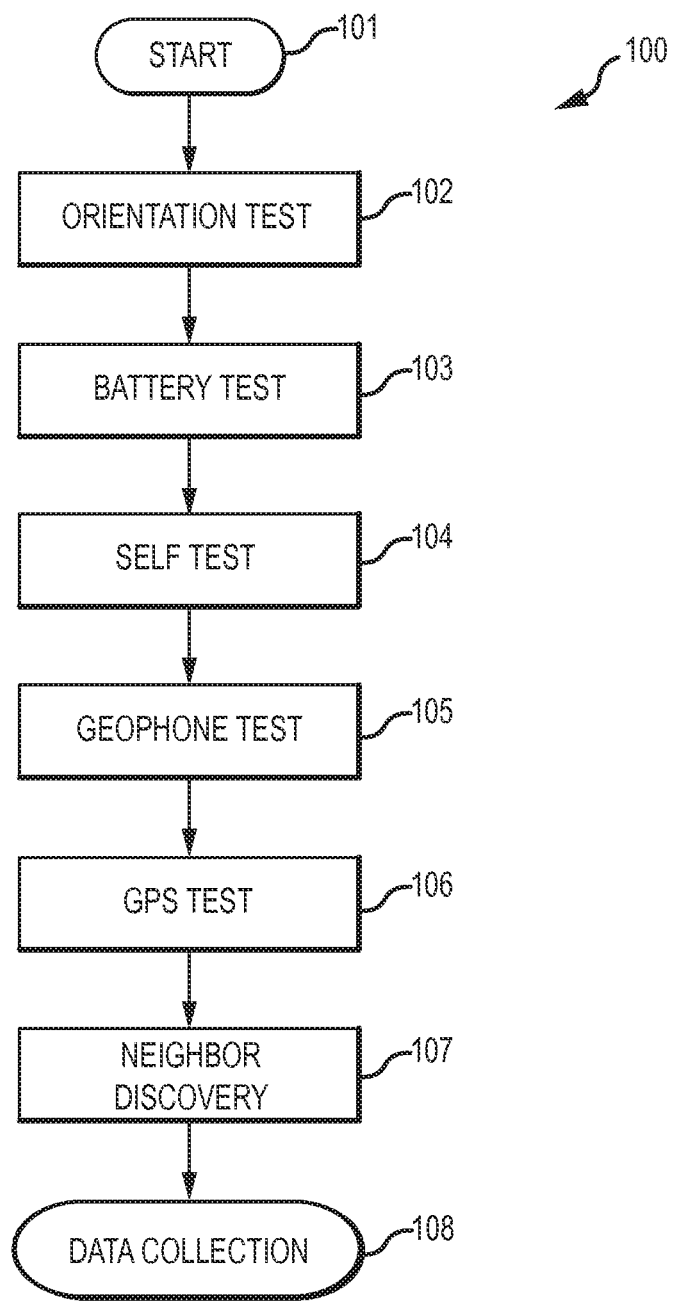
FIG. 1 is a flowchart depicting one embodiment of the operation of a representative system.

While the invention is susceptible to various modifications and alternative forms, specific embodiments thereof have been shown by way of example in the drawings and herein described in detail. It should be understood, however, that it is not intended to limit the invention to the particular form disclosed, but rather, the invention is to cover all modifications, equivalents, and alternatives falling within the scope of the invention as defined by the claims.

In the description below, the present invention will be described with reference to FIGS. 1-8. Initially, an overview of one process according to one embodiment of the present invention will be described with reference to FIG. 1. Next, each process described with reference to FIG. 1 is described with further detail in FIGS. 2-7. Also, an apparatus of one embodiment of the present invention is described with reference to FIG. 8.

Turning now to FIG. 1, a flow chart depicting one embodiment of an initialization process 100 is shown. The process of system initialization may begin at 101. The process may proceed to 102, wherein an orientation test 102 may be performed to determine the orientation of one or more wireless data acquisition modules. The orientation test 102 may be accomplished by way of a sensor located on the module. In one embodiment, the sensor may be a multi-axis tilt sensor. In an alternate embodiment, the sensor for determining the orientation of the module may be an accelerometer sensor that also may function as a seismic data acquisition sensor. In any regard, the sensor may be adapted to determine the orientation of the module. For instance, the sensor may detect when the module has been placed in a particular orientation (i.e. horizontal) or has been moved from a first orientation to a second orientation (i.e., from vertical to horizontal). The orientation test 102 may serve to initiate the remainder of the initialization process such that the orientation test 102 allows the sequence to proceed with initialization in response to a module being deployed.

At 103, a battery test may be performed to determine if an adequate supply of power is available to the module. For instance, the battery test 103 may be used to test and evaluate one or more batteries to determine if the amount of power available from the batteries is adequate to operate the module for a sufficient amount of time. The battery or batteries may be polled during the battery test 103 to evaluate the amount of charge remaining in the battery. For instance, a predetermined operational time may be established such that a battery with an expected life less than the operational time may cause the battery test 103 to set an error flag or place the unit in a standby or nonoperational state.

Furthermore, the wireless data acquisition module may perform a self test 104 wherein components of the module may undergo a test or series of tests to determine if they are functioning in accord with certain predetermined standards. The self test may include various tests or measurements conducted on module components. By way of example, the tests may include a memory test, a modem configuration test, voltage tests, current consumption tests, a humidity test, or a combination thereof.

Additionally, in one embodiment, a geophone test 105 may be performed, wherein the operation of seismic data acquisition components may be tested to determine if these components are functioning properly. The geophone test 105 may involve generating test signals that are in turn routed to the various sensors to be tested. The test may further include monitoring the output of the sensors in response to the test signals. If a failure or malfunction is detected, an error flag may be set to indicate that the geophone or its related components are not functioning properly.

A GPS test 106 may be performed to determine if a GPS receiver is functioning properly to obtain a valid GPS signal. The module may utilize the GPS receiver during the initialization process by powering the GPS receiver to test the unit and to acquire certain information from the GPS receiver at that time. By way of example, the module may determine a location and time based on data received by the GPS receiver during the GPS test 106. The GPS test 106 may further include powering the GPS receiver off after the conclusion of the GPS test 106 in order to conserve module battery life.

The wireless data acquisition module may also perform a neighbor discovery process 107 wherein neighboring wireless data acquisition modules may be discovered and a data transfer path may be established. Again, the neighbor discovery process 107 may be accomplished by establishing communications between at least two modules. For instance, a module may broadcast a discovery signal and wait for a response signal. Once the discovery and response signals have been transferred, the modules may further communicate data including, for example, data regarding the system status of the modules as determined in the various self test steps (e.g., 102-106).

The status of the module may be communicated among the wireless array comprised of the modules discovered in the discovery process. The communicated status information may be used to set up subnets or groups of modules. These subnets or groups may comprise separate serial data communication paths within the larger array. The division of the array into the subnets or subgroups may be at least partially based on the data transmitted during the establishing of the serial data communication paths. For instance, a module experiencing a malfunction with its geophone equipment may not be functional to sense seismic data, but may still be functional to receive and transmit data. As such, in response to communicated data regarding a geophone error flag identifying the malfunctioning geophone, the module may be used alternatively as a repeater in the array or may take on some other functionality. By way of example, a module may, based on the error flags set in the module during initialization, be configured in other ways to accommodate for the malfunctioning component. Examples include using a malfunctioning module as a time synchronization unit, a relay unit, or a location determination unit.

At step 108, the initialization process 100 may conclude and data collection 108 may commence. The data collection 108 may include collection and transmission of seismic data. This collection process may be carried out using the serial communication path that was established during the neighbor discovery process 107.

The process carried out in FIG. 1 may be completed at module startup. In this regard, the module may autonomously initialize, perform certain functions, seek and discover neighboring modules that may have also performed an initialization process, and establish a communication path among various units in an array. As can be further appreciated, in an array having many modules (e.g. hundreds or thousands of modules), initialization of the modules may be time consuming and require many trained technicians performing many initializations to complete. As such, manually initializing such a great number of modules may introduce a large potential for error. Therefore, it may be desirable to provide a means of autonomously initializing modules in response to an event that normally occurs during deployment of modules. In this regard, the modules may simply be set into place and then the modules may autonomously self initialize in response to an event that occurs during deployment without further interaction by a technician.

Figure 2:
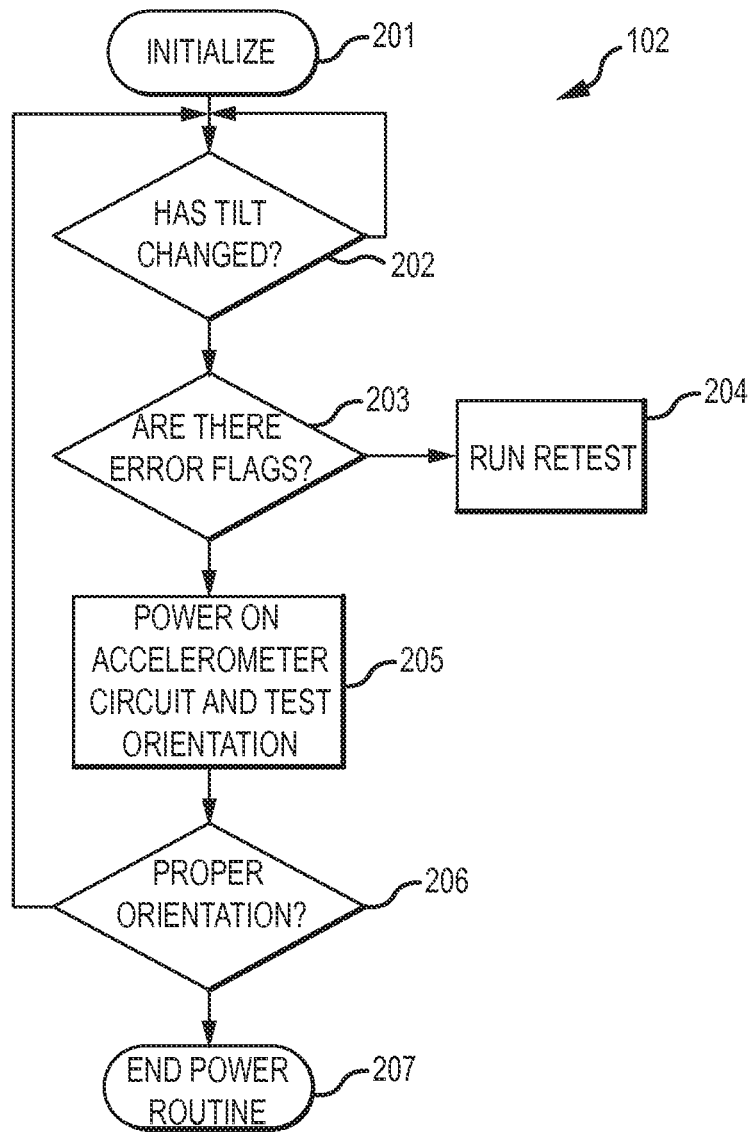
FIG. 2 is a flowchart depicting one sequence of activation according to an embodiment of the present invention.

Turning to FIG. 2, a flow chart depicting one embodiment of an orientation test 102 that responds to a deployment event in order to begin an initialization process of the wireless module is shown. The process may begin at 201 and may proceed to 202 wherein the orientation of the module may be monitored to determine if the module has experienced a certain motion, a change in position, or some other change in spatial orientation associated with deployment. Again, the monitoring may be accomplished, in one example, by way of a multi-axis tilt sensor. The orientation may be monitored to determine if an event or an orientation associated with deployment has been experienced by the module. The process may then proceed to 203 where it may be determined if any existing error flags have been set (e.g., error flags that were set in a previous initialization process). In the event that the module attempted initialization on a previous startup and failed, an error flag corresponding to the failed test may have been set as will be described further below with regard to the individual tests. As such, during the orientation test 200, if an error flag is set the process may proceed to 204 wherein a retest corresponding to the test that generated the error flag may be performed. In this regard, the retest 204 may determine if the condition that led to the previous error flag has been remedied.

Alternatively, if no error flag is present at 203, the process may proceed to 205. At 205, additional or alternate components may be powered up to further determine the position of the module. For instance, if the module is to be in the horizontal position after deployment, sensors may be polled at 205 to determine if the module is in fact horizontal.

It is to be understood that the static position of the module may not be the only stimulus that may trigger initialization. For instance, a series of movements may act as a trigger for initialization. The series of movements that serve as a trigger for initialization may include those normally experienced prior to or during deployment. In the event that the proper orientation is achieved at step 206, the process may continue to 207, wherein the orientation test may conclude and the module may continue the initialization process.

The orientation test 102 may serve as the means for powering on the unit. That is, the initialization and startup of the module may be triggered by the orientation of the module. As such, when deploying the module, an operator may simply place the module at a desired location in a predetermined orientation. By way of sensors, the module may be capable of determining that it is in the correct orientation and in response the module may initialize. The operator may not have any interaction with the module through switches, actuators, or inputs and may simply set the module in place and proceed to the next module.

Figure 3:
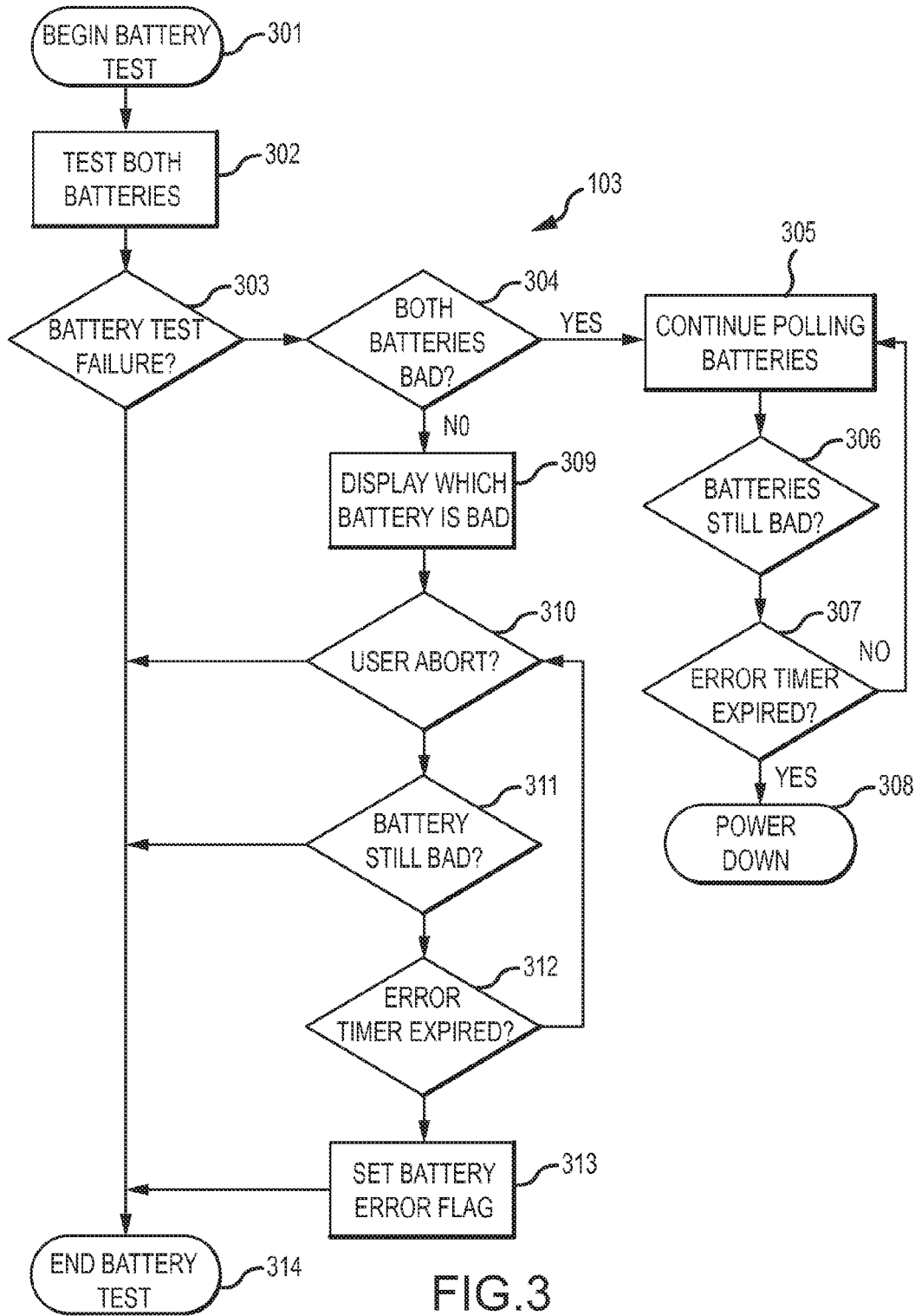
FIG. 3 is a flow chart depicting one embodiment of a battery test process.

Turning now to FIG. 3, a flow chart depicting one embodiment of the battery test process 103 is presented. The battery test 103 process may begin at 301 and may proceed to 302, wherein the status of the module power supply may be polled. The power supply may consist of, for example, a battery or a plurality of batteries, operative to power the wireless module. At 303, the status of the power supply may be analyzed to determine if the power supply conforms to certain preset parameters. By way of example, in the situation where the wireless module is powered by two batteries, it may be determined whether each or both batteries have sufficient power to operate the module for a predetermined amount of time. In the event both batteries have insufficient voltage levels to operate for the predetermined amount of time, the process may continue to 305. At 305, a timer may be initiated and the batteries may be polled to determine if the battery or batteries that were detected as having insufficient power have been replaced, charged, or otherwise have attained sufficient power by some other way. At 306, the process may continue polling to determine if the battery has sufficient charge. At 307, the timer of 305 may expire such that if the battery or batteries with insufficient change still fails to have a sufficient charge, the process may proceed to 308 and the system may power down. As an alternative to setting a timer 305 as described above, upon detecting an insufficient power supply, the process may terminate such that a user action or a subsequent change in orientation must occur before the battery test 103 is attempted again.

Returning to 304, in the event that only one of the two batteries has insufficient charge, the process may proceed to 309 wherein a display may be controlled to communicate which battery has an insufficient charge. At 310, a user may have the option to manually abort the initialization process. In the event the user does not manually abort, the process may proceed to 311, and the module may continually poll the battery with insufficient charge to determine if it has been replaced, changed, or charged. At 312, a timer may be set. In the event the battery with insufficient change is not replaced, changed, or charged the process may proceed to 313 and a battery error flag may be set. In the event the battery test is successful and an adequate power supply is detected, the process may proceed to 314 and the battery test may conclude.

Figure 4:
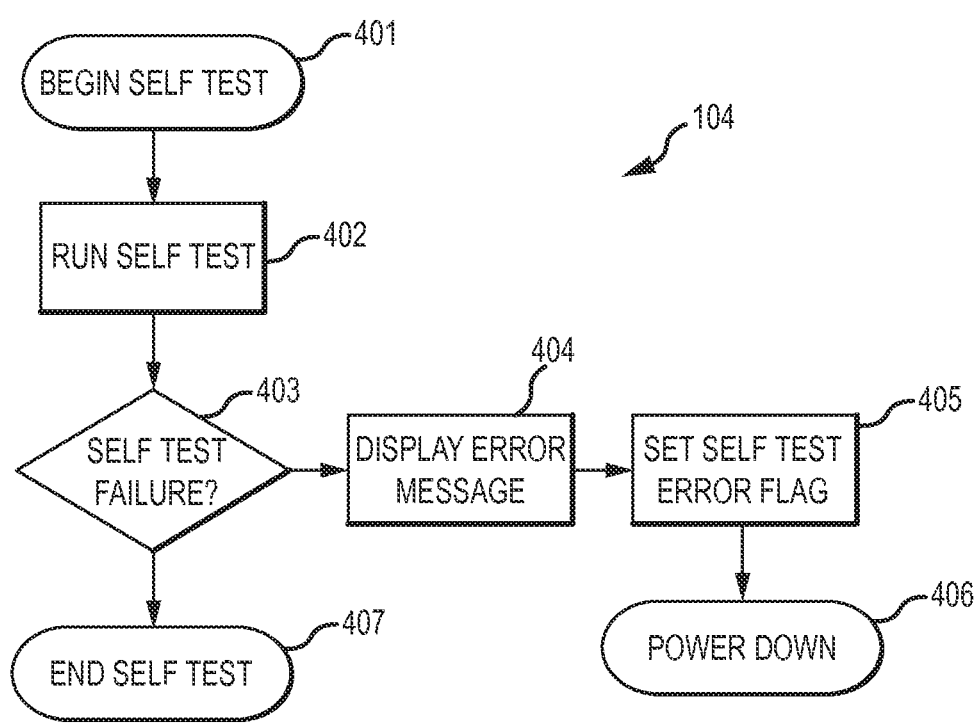
FIG. 4 is a flow chart depicting one embodiment of a self test process.

Turning to FIG. 4, a self test 104, such as the one in FIG. 1 may begin at 401. This may involve supplying a test signal and routing the test signal to data acquisition components such that various attributes of the module components may be monitored. The tested components may include, but are not limited to, a microcontroller, a processor, memory, I/O components, an oscillator, analog to digital converters, digital to analog converters, or other components. Typical analysis may include, but is not limited to, input noise, harmonic distortion, dynamic range, DC offset, and other tests or measurements.

The module may, at 403, determine whether the results of these tests or measurements are within certain established parameters. In the event that any one of the tests fail, the process may proceed to 404 where a display message may be communicated. A user may become aware of the error through monitoring the display. Additionally, at 405, a self test error flag may be set and the process may proceed to 406, wherein the wireless unit may power down. If the self test 104 is successful, the process may proceed to 407 where the self test process 104 ends.

Figure 5:
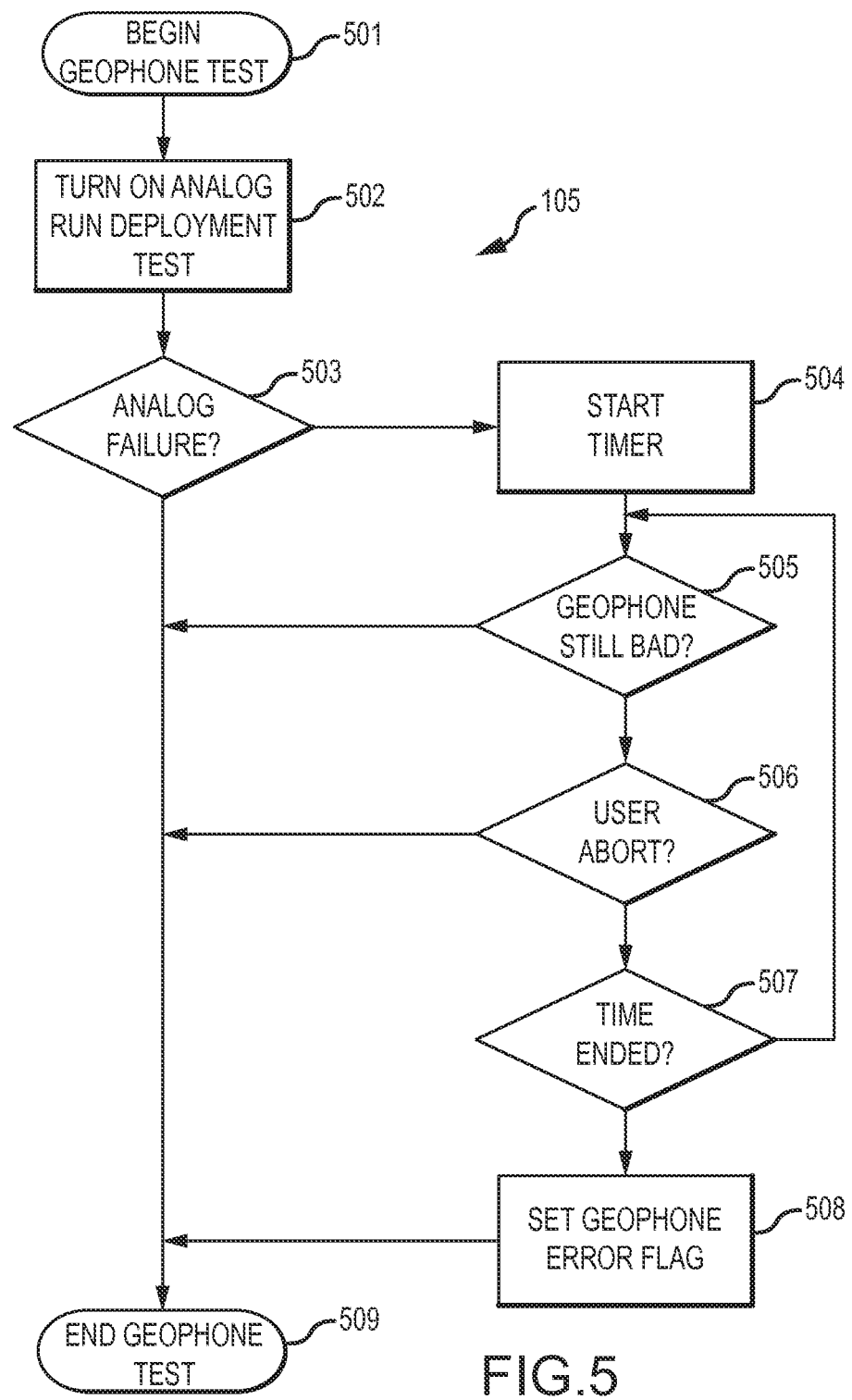
FIG. 5 is a flow chart depicting one embodiment of an analog geophone test.

In FIG. 5, a geophone test 105 is shown in accordance with one embodiment where the wireless module includes seismic data acquisition components. The components tested in the geophone test 105 may include, but are not limited to, an accelerometer or geophone, and various components for signal processing. By way of example, the geophone may be in communication with an analog to digital converter, an operational amplifier, a switch, or other signal processing components. The geophone test 105 may begin at 501 and may proceed to 502, wherein an analog run deployment test may be initiated. At 503, the module may determine whether certain values corresponding to results of measurements and tests performed on the seismic data acquisition components are within a specified range. Examples of these values measured and tested may include, but are not limited to, resistance, leakage, sensitivity, dampening, and natural frequency. If any of these tests or measurements is not within a predetermined range, the process may proceed to 504 wherein a timer may be initiated. At 505, the module may run the measurements or tests and may determine if the results of the tests or measurements on the components are still not within the specified range. Alternatively, the process may terminate until a user action or other change in orientation is detected, at which time the module may reinitiate and rerun the failed test. At 506, a user may choose to abort the process. At 512 if it is determined that the timer that began at 504 has expired, the process may proceed to 508 wherein a geophone error flag may be set. If the test is successful at 503, or at any intervening step (505, 506, 507) prior to the expiration of the timer, the process may proceed to 509 and the geophone test 105 may end.

Figure 6:
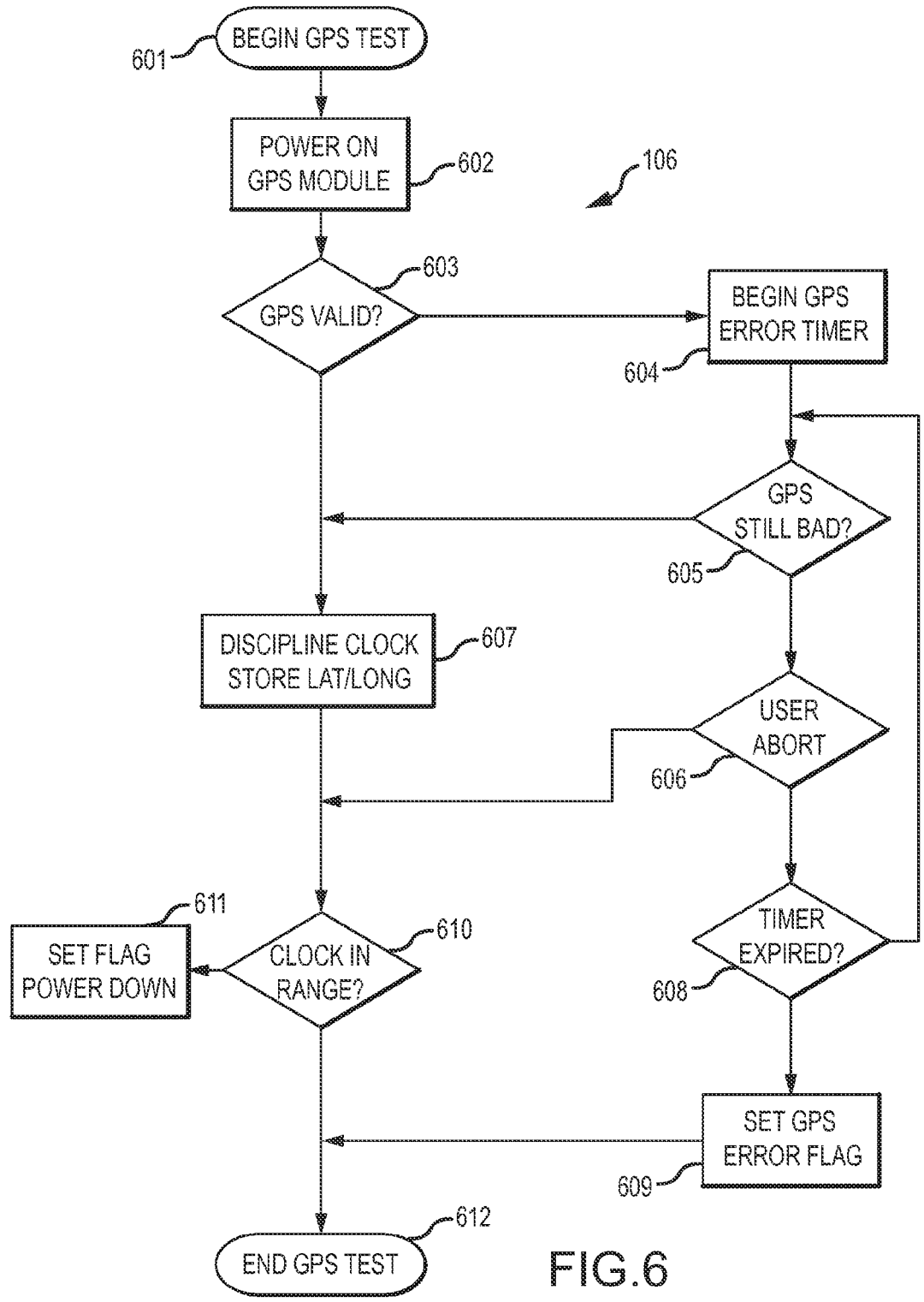
FIG. 6 is a flow chart depicting one embodiment of a GPS test.

In FIG. 6, a flow chart depicting a GPS module test 106 is shown. The GPS module test 106 may begin at 601 and may proceed to 602, wherein a GPS module is powered on. At 603, the module may run various tests to determine if a valid GPS signal can be obtained. The GPS receiver that is polled may be in communication with a device that provides the GPS receiver metadata (e.g., ephemeris and almanac data) to assist the GPS receiver in obtaining a signal. If a valid signal is not obtained, the process may proceed to 604, wherein a timer may be initiated. The process may proceed to 605 and the GPS module may be continually polled to determine if a valid GPS signal has been obtained. Additionally, at 606 the user may choose to abort the test. At 608, the timer set in 604 may expire and the process may move on to 609 in the event no valid signal is obtained prior to expiration of the timer. In this case, a GPS error flag may be set. Alternatively, upon failing to obtain a valid GPS signal, the GPS test 106 may terminate. As such, it may require a user action or a change in orientation to reinitialize the module before the GPS test 106 is attempted again.

If a valid GPS signal is obtained at 603, the process may proceed to 607 where the module clock may be disciplined to GPS time and location data of the module may be determined and stored. When disciplining the module clock using the GPS receiver, software, hardware, or both may be synchronized to a time component of the GPS signal. At 610, the module clock may be analyzed to determine if the clock is within a certain offset from the GPS time obtained at 603. If the clock falls outside a preset range, the process may proceed to 611, an error flag may be set and the unit may power down. If the clock is within range at 610, the process may proceed to 612 and the GPS test 106 may conclude.

Figure 7:
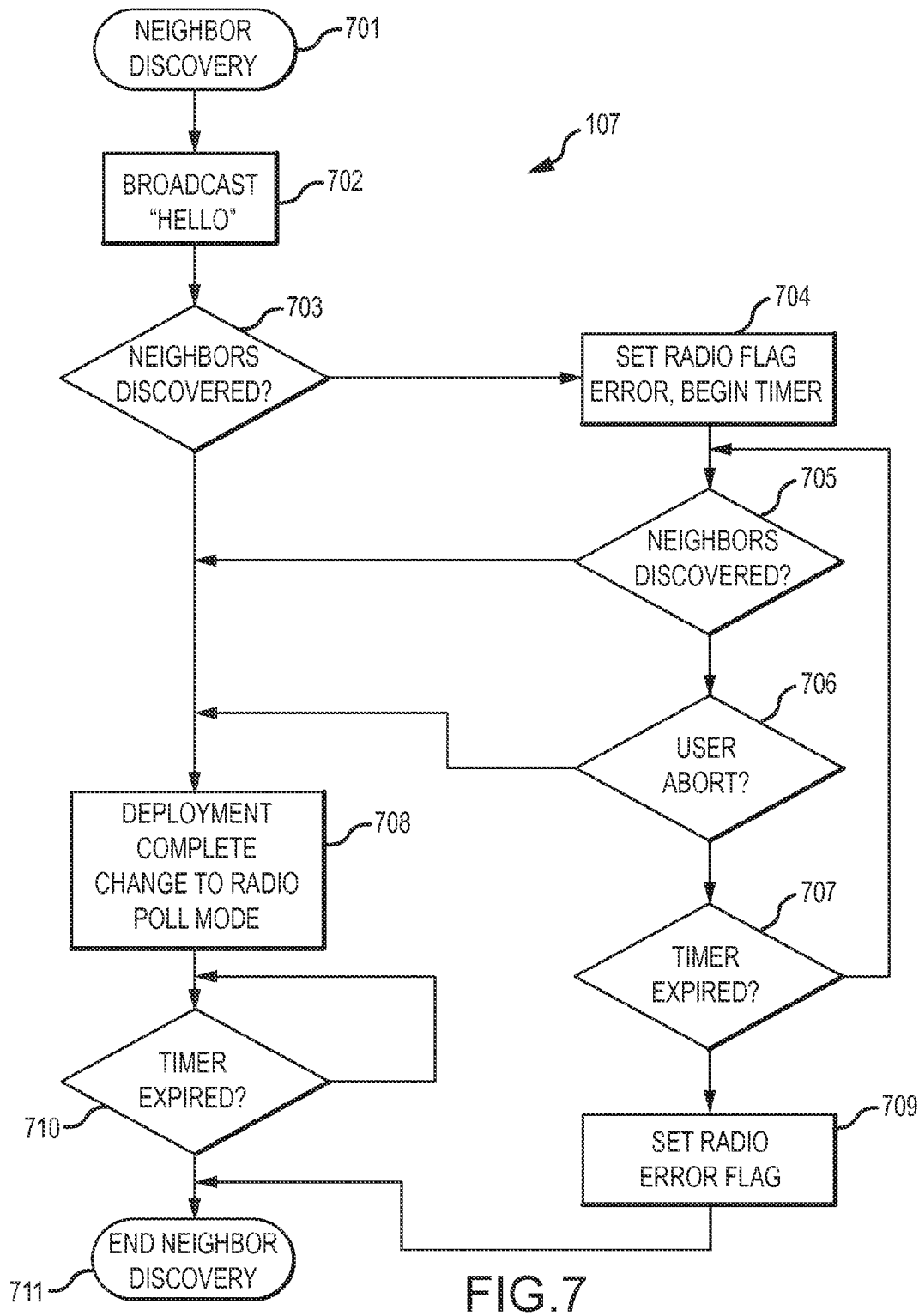
FIG. 7 is a flow chart depicting one embodiment of a neighbor discovery process.

In accordance with one embodiment of the present invention, FIG. 7 shows a neighbor discovery process 107. At 701, the neighbor discovery process 107 may be initiated. At 702, the wireless module may broadcast a discovery signal and may await a neighbor response. If a return single is received, the return signal may be scrutinized at 703 to determine if a neighbor has been discovered. If no neighbor is discovered, the process may proceed to 704 and a radio flag error may be set and a timer may begin. At 708, the module may continually broadcast discovery signals and await responses to determine if discoverable neighbors are present. At 706, a user may choose to abort the process. At 707, the timer set in 704 may expire. If the timer expires without a neighbor being discovered, the process may proceeds to 709 and the module may set a radio error flag. Alternatively, the neighbor discovery process 107 may terminate such that a user action or change in orientation of the module is required to reinitiate the neighbor discovery process 107. If at 703, neighbors are discovered the process may proceed to 708, wherein deployment may be complete and the wireless data module may proceed to a radio poll mode such that data polling initiates. Data polling may continue at step 710 until a predetermined timer has expired, at which time the process may proceed to 711 and may terminate.

During the deployment of wireless modules into an array, it may be that some modules malfunction during or prior to initialization or the establishing of a communication path. In this regard, the malfunctioning modules may inhibit the array from providing functionality normally associated with such an array. For instance, a module may have a malfunctioning sensor. In an example where the array is a seismic data acquisition system, the malfunctioning sensor may correspond to a geophone that is unresponsive or whose data is corrupted by a malfunction. Accordingly, the module may fail one or more of the tests performed in the initialization process such that error flags may have been set corresponding to the failed test. While the module may not have the ability to acquire seismic data due to the malfunctioning geophone, the module may still be used to perform some other functionality in the array.

As such, during a neighbor discovery process, information may be communicated from one module to other modules regarding a malfunction experienced at a module. Accordingly, the module, in conjunction with the other modules of the array, may be configured such that the malfunctioning module only performs certain tasks.

By way of example, the malfunctioning module may not be operative to acquire data due to a malfunction, but may be fully functional to receive and transmit data. That is, the module may be operative to establish a communication path, but not contribute data to the communication path. Alternatively, the module may have some other error. In some instances, the module may be left out of the array entirely, such that the surrounding modules may ignore or otherwise not communicate with the malfunctioning module. In any regard, the modules may communicate their status among the other modules such that the modules may, without human intervention, establish an array.

Figure 8:
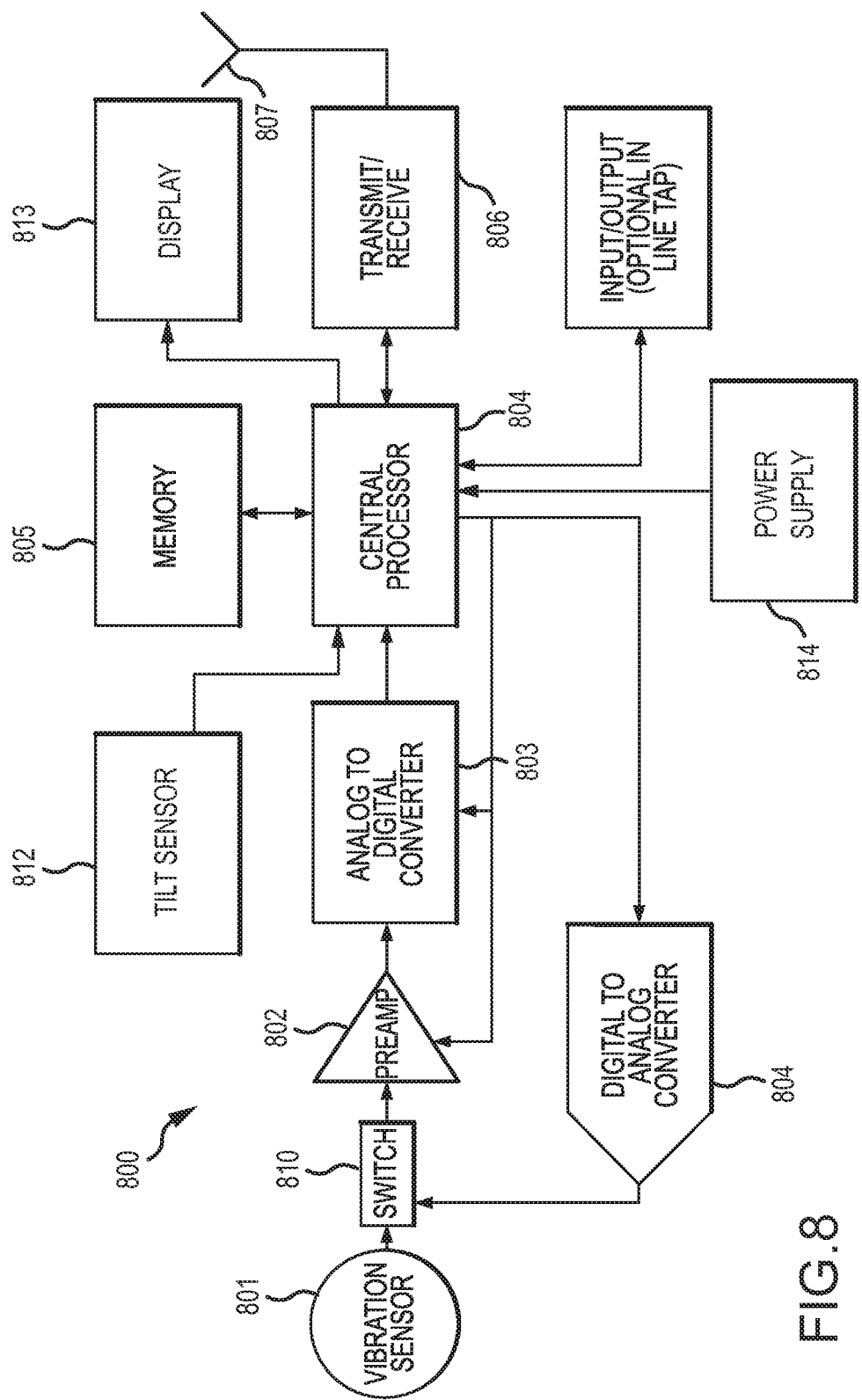
FIG. 8 is a schematic drawing of an apparatus according to one embodiment of the present invention.

With reference to FIG. 8, a block diagram of one embodiment of a wireless data acquisition module 800 is shown. In one embodiment, the module 800 may be part of a seismic data acquisition system to perform a seismic survey. The wireless data acquisition module 800 may have a vibration sensor 801 that is operative to detect seismic activity. The vibration sensor 801 may be an analog sensor or a digital sensor. The vibration sensor 801 may transmit either an analog or digital signal to a switch 810, a preamplifier 802, and analog to digital converter 803. It is to be understood that if the vibration sensor 801 is a digital sensor, the preamp 802 and analog to digital converter 803 may not be necessary and the vibration sensor may directly transmit digital data to the central processor 804.

The central processor 804 may include a memory 805 suitable to store digitized seismic data. The central processor 804 may be in further communications with a digital to analog convertor 808 whereby digital signals generated by the central processor 804 may be connected to analog signals and may be routed to the switch 810. This may be used, for example, to create a test signal by the central processor 804 which is then transmitted to the digital to analog converter 808, converted into an analog signal and transmitted via the switch 810 in order to test the functioning of various components of the system 800. Additionally, a transceiver 806 may be provided in communication with an antenna 807. The transceiver 806 may be in communication with the central processor 804.

The module 800 may include a power supply 814 that provides power to the module 800. Additionally, the power supply 814 may supply a signal to the central processor 804 such that the status of power supply 814 may be monitored by the central processor 804. Additionally, a tilt sensor 812 may be provided in communication with the central processor 804 such that the orientation of the system 800 may be determined and monitored. Optionally, a display 813 may be controlled by the central processor 804 to display various messages to a user.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

The invention claimed is:

1. A method of enabling a seismic data acquisition module, the method comprising:
   initializing the seismic data acquisition module in response to a sensed change in orientation of the seismic data acquisition module from a first orientation to a second orientation relative to the surface of the Earth sensed by a tilt sensor of the seismic acquisition module; and
   acquiring seismic data at the seismic data acquisition module after the initializing.

2. The method of claim 1, further comprising:
   monitoring the orientation of the seismic data acquisition module with a tilt sensor.

3. The method of claim 2, wherein the tilt sensor is a multi axis accelerometer.

4. The method of claim 1, further comprising:
   performing at least one autonomous test.

5. The method of claim 4, wherein results of the at least one autonomous test are communicated in said discovering.

6. The method of claim 4, wherein the at least one autonomous test includes at least one of a battery test, a self test, an analog test, and a GPS test.

7. The method of claim 6, wherein the battery test comprises:
determining a charge level of a battery; and
comparing the charge level to a predetermined threshold charge value.

8. The method of claim 6, wherein the self test includes at least one of an analog performance memory test, a GPS serial test, a modem register configuration test, a voltage test, a current consumption test, and a humidity test.

9. The method of claim 6, wherein the analog test includes at least one of a geophone ohms test, a leakage test, and a noise test.

10. The method of claim 8, wherein the GPS test comprises:
verifying a valid GPS signal;
disciplining a system time using the valid GPS signal.

11. The method of claim 10, wherein the GPS test further comprises:
powering a GPS unit down after said verifying and disciplining.

12. The method of claim 1, wherein the discovering comprises:
broadcasting a discovery signal from the wireless seismic data acquisition module; and
receiving a reply signal from a second module.

13. The method of claim 12, further comprising:
establishing a data transfer path between the seismic data acquisition module and the second module.

14. A seismic data acquisition module, comprising:
a transceiver;
an activation sensor capable of sensing a change in orientation of the seismic data acquisition module from a first orientation to a second orientation relative to the surface of the Earth and producing an output in response to the change in orientation;
a microprocessor in operative communication with the activation sensor and operative to interpret the output to determine if the seismic data acquisition module is in a deployed orientation;
a seismic data acquisition sensor operative to detect seismic activity;
wherein, upon said determining the seismic data acquisition module is in the deployed orientation, the microprocessor is operative to receive seismic data from the seismic data acquisition sensor at least for storage of the seismic data in a memory of the seismic data acquisition module.

15. The seismic data acquisition module of claim 14, wherein the activation sensor is a tilt sensor.

16. The seismic data acquisition module of claim 15, wherein the tilt sensor is a three axis accelerometer.

17. The seismic data acquisition module of claim 14, further comprising;
a battery test module, responsive to said determining the seismic data acquisition module is in the deployed orientation, for determining an available power supply to the seismic data acquisition module.

18. The seismic data acquisition module of claim 17, wherein the battery test module includes a power supply, an analog to digital converter in electrical communication with the power supply and a microprocessor, wherein the analog to digital converter converts a voltage signal from the power supply to a digital voltage signal that is interpreted by the microprocessor to calculate a battery life value for the power supply.

19. The seismic data acquisition module of claim 14, further comprising;
a self test module, responsive to said determining the seismic data acquisition module is in the deployed orientation, for testing functionality of module control components.

20. The seismic data acquisition module of claim 19, wherein the self test module includes a microprocessor in electrical communication with a digital to analog converter operative to convert a test signal from the microprocessor into an analog test signal that is transmitted to a plurality of module sensors.

21. The seismic data acquisition module of claim 14, further comprising;
a deployment test module, responsive to said determining the seismic data acquisition module is in the deployed orientation, for testing functionality of the seismic data acquisition components.

22. The seismic data acquisition module of claim 21, wherein the deployment test module is capable of performing a geophone ohms test, a leakage test, and a noise test in the seismic data acquisition sensor.

23. The seismic data acquisition module of claim 14, wherein the deployment test module includes a microprocessor in electrical communication with a digital to analog converter operative to convert a test signal from the microprocessor into an analog test signal that is transmitted to a the seismic data acquisition sensor.

24. The seismic data acquisition module of claim 14, further comprising;
a GPS test module, responsive to said determining the seismic data acquisition module is in the deployed orientation, for testing functionality of a GPS receiver on the module.

25. The seismic data acquisition module of claim 24 wherein the GPS test module includes a GPS receiver in communication with a microprocessor.

* * * * *